(12) United States Patent
Luo et al.

(10) Patent No.: US 11,816,403 B2
(45) Date of Patent: Nov. 14, 2023

(54) METHOD OF ORTHOGNATHIC SURGICAL OCCLUSAL PLATE BASED ON ARTIFICIAL INTELLIGENCE

(71) Applicant: Sichuan University, Sichuan (CN)

(72) Inventors: En Luo, Chengdu (CN); Zhao Kun Zhu, Chengdu (CN); Zhikai Liu, Chengdu (CN); Chunwei Xu, Chengdu (CN); Yao Liu, Chengdu (CN); Yue Tai, Chengdu (CN); Zhen Liu, Chengdu (CN)

(73) Assignee: Sichuan University, Chengdu (CN)

( * ) Notice: Subject to any disclaimer, the term of this patent is extended or adjusted under 35 U.S.C. 154(b) by 0 days.

(21) Appl. No.: 17/994,402

(22) Filed: Nov. 28, 2022

(65) Prior Publication Data

US 2023/0267245 A1 Aug. 24, 2023

(30) Foreign Application Priority Data

Jan. 25, 2022 (CN) .......................... 202210085021.2

(51) Int. Cl.
*G06F 30/20* (2020.01)
*A61C 13/34* (2006.01)

(52) U.S. Cl.
CPC .............. *G06F 30/20* (2020.01); *A61C 13/34* (2013.01)

(58) Field of Classification Search
CPC ................................ G06F 30/20; A61C 13/34
USPC .......................................................... 703/7
See application file for complete search history.

(56) References Cited

U.S. PATENT DOCUMENTS

| 5,678,991 | A | * | 10/1997 | Eganhouse .............. A61C 7/36 433/19 |
| 2009/0311647 | A1 | * | 12/2009 | Fang .................... A61C 19/045 433/24 |
| 2018/0147015 | A1 | * | 5/2018 | She ........................ G16H 50/50 |
| 2020/0405456 | A1 | | 12/2020 | Nikolskiy et al. |

FOREIGN PATENT DOCUMENTS

| CN | 102715965 A | 10/2012 |
| CN | 103932807 A | 7/2014 |
| CN | 112168396 A | 1/2021 |
| CN | 112545679 A | 3/2021 |
| CN | 113425428 A | 9/2021 |

\* cited by examiner

*Primary Examiner* — Andre Pierre Louis

(57) ABSTRACT

The present invention discloses a method for designing an orthognathic surgical occlusal plate based on artificial intelligence, including scanning a gypsum model of the maxillary and mandibular dentition to obtain the corresponding three-dimensional model of the maxillary and mandibular dentition; then obtaining the fitting data and establishing a coordinate system; generating thickness control elements and two-dimensional contour lines; controlling thickness of the three-dimensional model and generating occlusal imprint: and modifying the thickness and occlusal imprint of the three-dimensional model to obtain an artificial intelligence occlusal plate. The invention can greatly save the time required for designing the occlusal plate, improve the work efficiency, and the accuracy of the artificial orthognathic surgery occlusal plate is not significantly different from that of the manual occlusal plate in the application of orthognathic surgery.

4 Claims, 5 Drawing Sheets

METHOD OF ORTHOGNATHIC SURGICAL OCCLUSAL PLATE BASED ON ARTIFICIAL INTELLIGENCE

FIELD OF THE INVENTION

The invention relates to the field of oral medical technology, in particular to a design method of an orthognathic surgical occlusal plate based on artificial intelligence.

BACKGROUND OF THE INVENTION

The development of digital medical technology in the field of oral and maxillofacial surgery is increasingly extensive and in-depth. In the field of orthognathic surgery, with the rapid development of various virtual surgical design software, combined with guide plate production and 3D printing, the application of digital medical technology in the field of orthognathic surgery is becoming more and more mature. Artificial intelligence, mainly refers to the set programs that can complete events that usually require human intelligence, including but not limited to speech and image recognition and learning, visual perception, mathematical operations, reasoning and problem solving, which is a highly interdisciplinary subject, and is closely integrated and closely related to medical field. Since the 1990s, artificial intelligence represented by artificial neural networks has developed rapidly, and artificial intelligence has gradually become an important cornerstone of current intelligent medical care. Orthognathic surgery occlusal plate is an important tool to assist orthognathic surgery, and the precise design of the occlusal plate can make orthognathic surgery safer and more efficient. However, to complete the production of the digital occlusal plate requires the deep participation of clinicians to master the use of these design software, and the whole process is very cumbersome. The design and production of digital occlusal plates are often completed by clinicians, and there are problems such as high proportion of repetitive labor, low efficiency, and long time.

SUMMARY OF THE INVENTION

In view of this, the present invention provides an artificial intelligence based orthognathic surgery occlusal plate design method, which greatly reduces the time required to design the occlusal plate and improves the work efficiency under the premise of ensuring accuracy.

The invention discloses an artificial intelligence based design method for an orthognathic surgical occlusal plate, includes:
  Scan the gypsum model of the maxillary and mandibular dentition to obtain a corresponding three-dimensional model of the maxillary and mandibular dentition;
  Based on the three-dimensional model of the maxillary and mandibular dentition, a fitting data is obtained and a coordinate system is established;
  Based on the fitted data, generate thickness control elements and two-dimensional contour line;
  Based on the thickness control elements and the two-dimensional contour line, control the thickness of the three-dimensional model of the maxillary and mandibular dentition and generate the occlusal imprint of the three-dimensional model of the maxillary and mandibular dentition;
  The thickness and occlusal imprint of the three-dimensional model of the maxillary and mandibular dentition are modified to obtain an artificial intelligence occlusal plate;

Preferably, the scanning of the maxillary and mandibular dentition gypsum models to obtain the corresponding three-dimensional models of the maxillary and mandibular dentition, includes;
  For a given gypsum model of the maxillary and mandibular dentition, it is scanned into a standard file type data format applied by the rapid prototyping system, and the corresponding three-dimensional model of the maxillary and mandibular dentition is obtained.

Preferably, the foregoing based on the three-dimensional model of the maxillary and mandibular dentition, the fitting data is obtained and the coordinate system is established, includes:
  Obtain the planes fitted by the points of the three-dimensional model of the maxillary and maxillary dentition, i.e. the maxillary fitting plane and the mandibular fitting plane;
  According to all points in the maxillary and mandibular model, a polar coordinate system is established by the plane where the main axis and lateral axis are located to calculate the angle θ of all points in the maxillary and mandibular model;

Preferably, the foregoing according to all points in the maxillary and mandibular model, the polar coordinate system is established by the plane where the main axis and lateral axis are located to calculate the angle θ of all points in the maxillary and mandibular model, includes:
  Combine all the points in the maxillary and mandibular model into a point set, and obtain the overall center point and central plane, main axis, lateral axis and normal vector through principal component analysis; establish a polar coordinate system through the plane where the main axis and lateral axis are located to calculate the angle θ of all points of the maxillary and mandibular model;

Preferably, the generating the thickness control elements and the two-dimensional contour line according to the fitting data, includes:
  According to the fitting data, simplify the occlusal plate and judge the opening;
  Generate thickness control elements;
  Generate two-dimensional contour line.

Preferably, the according to the fitting data, the occlusal plate is simplified and the opening is judged, includes:
  Both the maxillary fitting plane and the mandibular fitting plane are simplified to a U shape, and they are equally divided into 20 intervals in the range of $[-\pi,\pi)$, and the distribution of the angle θ of all points is calculated. Find out the angle interval without any points, so as to determine the opening of the U-shaped, and correct the direction of the main axis toward the central incisor.

Preferably, the generating a thickness control element includes:
  The maxillary assembly and mandibular assembly were obtained by extruding the maxillary fitting plane and mandibular fitting plane outward respectively.

Preferably, the generating a two-dimensional contour line, includes:
  The points concentrated in the range of $(-\pi/2, \pi/2)$, that is, the points in the U-shaped semicircle area, are fitted to inner and outer contour curves of the semicircular area of the U-shaped plate. For the points beyond $(-\pi/2, \pi/2)$ range of points, fit as a straight line segment, and connect with the foregoing curves to obtain a complete two-dimensional contour line of the U-shaped plate and smooth it.

Preferably, the foregoing according to the thickness control elements and the two-dimensional contour line, controlling the thickness of the three-dimensional model of the maxillary and mandibular dentition and generating the occlusal imprint of the three-dimensional model of the maxillary and mandibular dentition, includes:

The two-dimensional contour line is linearly 3D stretched to obtain the initial three-dimensional U-shaped plate, and then according to the thickness control elements and the two-dimensional contour line, the maxillary assembly and the mandibular assembly are subtracted to control the thickness.

By moving the overall central plane according to the normal vector, the relationship between the occlusal plate and the maxillary and mandibular dentition can be further coordinated, and the maxillary dentition and the mandibular dentition can be subtracted from the overall dentition model by Boolean operation to obtain the occlusal imprint of the occlusal plate.

Preferably, the thickness and occlusal imprint of the three-dimensional model of the maxillary and mandibular dentition are modified to obtain an artificial intelligence occlusal plate, includes:

Kalman filtering, smoothing and hole filling operations are performed to ensure water tightness, and the final 3D U-shaped plate, i.e., the artificial intelligence occlusal plate is obtained.

Due to the adoption of the above technical solutions, the present invention has the following advantages: in the research and development process, the STL dentition models of various malocclusion patients are used for research, the rationality of the AI occlusal plate contour line and the accuracy of the algorithm are manually verified, and then continuous optimization of the contour lines and algorithm models is carried out to develop an artificial intelligence orthognathic surgical plate automatic design program, referred to as AIPlate. After optimization, the contour line has gradually become smoother from the initial steepness, and the occlusal imprint is more in line with clinical needs and meets the clinical use standard. The shape and cusp relationship of the AI occlusal plate is not significantly different from that of the manual occlusal plate, but it can greatly save the time required to design the occlusal plate. The accuracy of artificial orthognathic surgical occlusal plate is not significantly different from that of manual occlusal plate in the application of orthognathic surgery.

BRIEF DESCRIPTION OF THE DRAWINGS

In order to more clearly illustrate the technical solution of the present invention, the drawings described in the embodiment will be briefly described below, and it should be understood that the following drawings are only shown in some embodiments of the present invention, so it should be seen as a defined scope, and will be obtained in accordance with these figures, without paying creative labor, in terms of ordinary skill in the art.

DETAILED DESCRIPTION OF PREFERRED EMBODIMENTS

The present invention will be further described with reference to the accompanying drawings and embodiments. Obviously, the described embodiments are only a part of the embodiments of the present invention, rather than all the embodiments. All other embodiments obtained by those of ordinary skill in the art should fall within the protection scope of the embodiments of the present invention.

Figure 1:
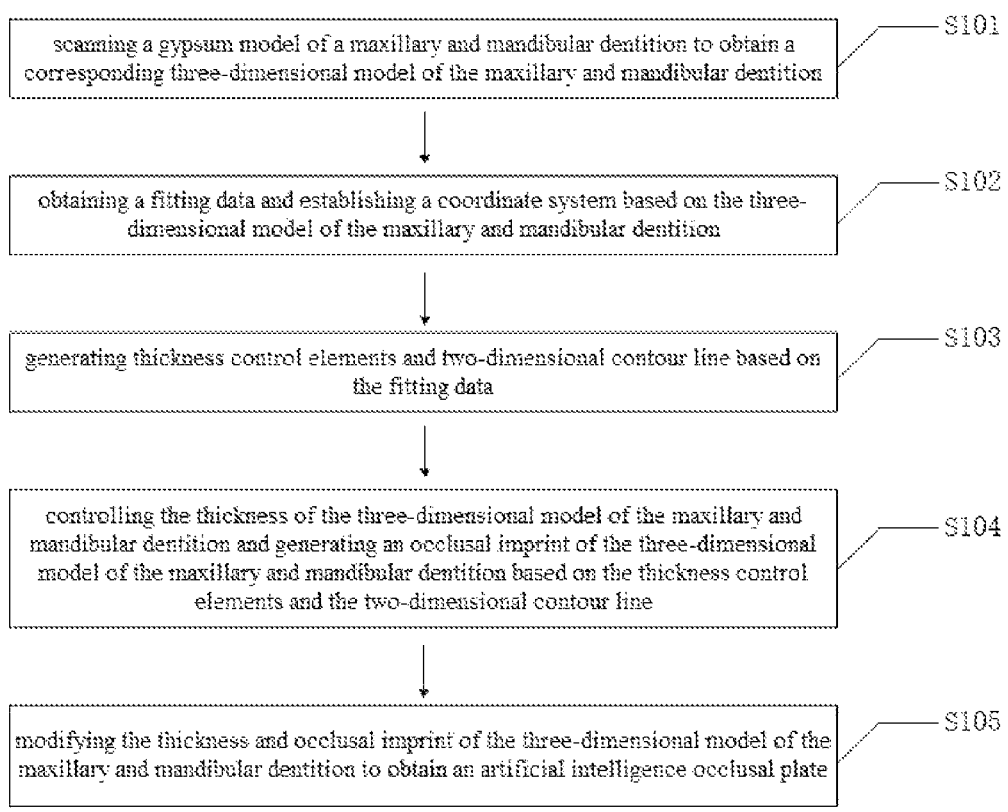
FIG. 1 is a schematic flowchart of an artificial intelligence-based design method for an orthognathic surgical occlusal plate according to an embodiment of the present invention.

Referring to FIG. 1, the present invention provides an embodiment of an artificial intelligence-based orthognathic surgical occlusal plate design method, which includes:

S101: scan the gypsum model of a maxillary and mandibular dentition to obtain a corresponding three-dimensional (3D) model of the maxillary and mandibular dentition.

S102: obtain a fitting data and establish a coordinate system according to the three-dimensional model of the maxillary and mandibular dentition;

S103: according to the fitting data, generate thickness control elements and a two-dimensional (2D) contour line.

S104: according to the thickness control elements and the two-dimensional contour line, control the thickness of the three-dimensional model of the maxillary and mandibular dentition and generate the occlusal imprint of the three-dimensional model of the maxillary and mandibular dentition;

S105: modify the thickness and occlusal imprint of the three-dimensional model of the maxillary and mandibular dentition to obtain an artificial intelligence occlusal plate.

In this embodiment, the scanning the gypsum model of the maxillary and mandibular dentition to obtain the corresponding three-dimensional models of the maxillary and mandibular dentition, includes:

For a given gypsum model of the maxillary and mandibular dentition, it is scanned into a standard file type data format applied by the rapid prototyping system, and the corresponding 3D model of the maxillary and mandibular dentition is obtained.

In this embodiment, the according to the three-dimensional model of the maxillary and mandibular dentition, the fitting data is obtained and the coordinate system is established, includes:

Obtain the planes fitted by the points of the 3D model of the maxillary and mandibular dentition, i.e., the maxillary fitting plane and the mandibular fitting plane.

According to all points in the maxillary and mandibular model, the polar coordinate system is established by the plane where the main axis and lateral axis are located to calculate the angle θ of all points in the maxillary and mandibular model.

In this embodiment, the according to all the points in the maxillary and mandibular model, the polar coordinate system is established by the plane where the main axis and the lateral axis are located to calculate the angle θ of all the points of the maxillary and mandibular model, includes:

Combine all the points in the maxillary and mandibular model into a point set, and obtain the overall center point and central plane, main axis, lateral axis and normal vector through principal component analysis; establish a polar coordinate system through the plane where the main axis and lateral axis are located to calculate the angle θ of all points of the maxillary and mandibular model.

In this embodiment, the generation of thickness control elements and two-dimensional contour lines according to the fitting data includes:

According to the fitting data, simplify the occlusal plate and judge the opening;
Generate thickness control elements;
Generate 2D contour lines In this embodiment, the according to the fitting data, the occlusal plate is simplified and the opening is judged, includes:

Both the maxillary fitting plane and the mandibular fitting plane are simplified to a U shape, and they are equally divided into 20 intervals in the range of $[-\pi,\pi)$, and the distribution of the angle θ of all points is calculated. Find out angle intervals without the points, so as to judge the opening of the U-shaped, and correct the direction of the main axis, toward the central incisor.

In this embodiment, the generating the thickness control element, includes:

The maxillary assembly and mandibular assembly are obtained by extruding the maxillary fitting plane and mandibular fitting plane outward respectively.

In this embodiment, the generating a two-dimensional contour line, includes:

The points concentrated in the range of $(-\pi/2, \pi/2)$, that is, the points in the U-shaped semicircle area, are fitted to the inner and outer contour curves of the semicircular area of the U-shaped plate. For the points beyond $(-\pi/2, \pi/2)$ range of points, fit as a straight line segment, and connect with the foregoing curves to obtain a complete two-dimensional contour line of the U-shaped plate and smooth it.

In this embodiment, the foregoing according to the thickness control elements and the 2D contour line, controlling the thickness of the 3D model of the maxillary and mandibular dentition and generating the occlusal imprint of the 3D model of the maxillary and mandibular dentition, includes:

The two-dimensional contour line is linearly 3D stretched to obtain the initial three-dimensional U-shaped plate, and then according to the thickness control elements and the two-dimensional contour line, the maxillary assembly and the mandibular assembly are subtracted to control the thickness.

By moving the overall central plane according to the normal vector, the relationship between the occlusal plate and the maxillary dentition can be further coordinated, and the maxillary dentition and the mandibular dentition can be subtracted from the overall dentition model by Boolean operation to obtain the occlusal imprint of the occlusal plate.

In this embodiment, the thickness and occlusal imprint of the three-dimensional model of the maxillary and mandibular dentition are modified to obtain an artificial intelligence occlusal plate, includes:

Kalman filtering, smoothing and hole filling operations are performed to ensure water tightness, and the final 3D U-shaped plate, i.e., the artificial intelligence occlusal plate is obtained.

Figure 2:
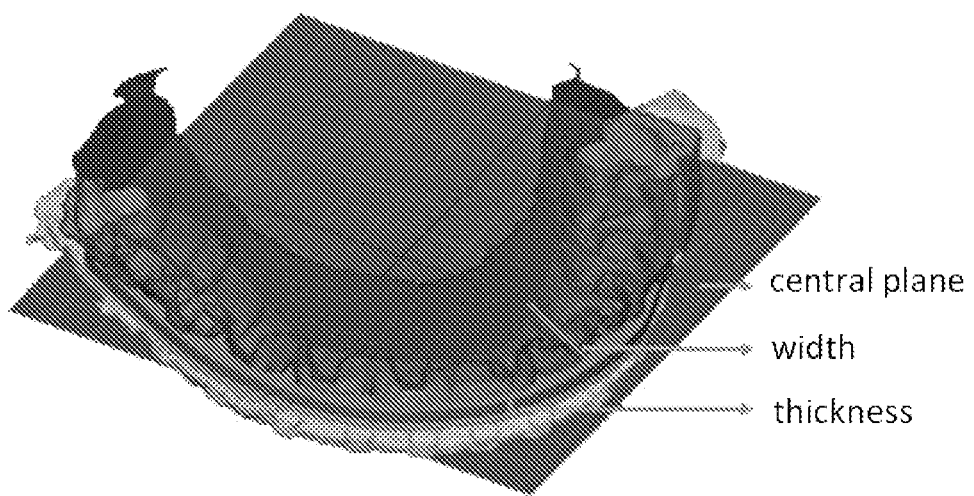
FIG. 2 is a schematic diagram of the basic elements of the artificial intelligence occlusal plate according to the embodiment of the present invention.

The present invention also provides a more specific application embodiment:

Orthognathic surgical plate is to use the preoperative dentition model for occlusal alignment, fix the model in a suitable position, and complete the production of manual plate or digital plate. In this embodiment, the orthognathic surgical plate made based on artificial intelligence is referred to as artificial intelligence plate for short, and the plate manually made according to digital software is referred to as ordinary plate for short. See FIG. 2, in order to achieve the goal that the finished product of the artificial intelligence occlusal plate is indistinguishable from the ordinary occlusal plate, the elements of width, thickness, position of the maxillary and mandibular central planes, and voxel density are used to describe the occlusal plate.

The width refers to the distance of the occlusal plate in the horizontal direction. The distance of the occlusal plate in different parts of the same plane is different. The width is determined by the outline of the maxillary and mandibular dentition, which can be adjusted to enlarge or narrow. Thickness refers to the distance of the occlusal plate along a vertical direction, and the thickness can adjust the depth of the occlusal imprint of the occlusal plate. The adjustment of the central plane can coordinate the depth of the occlusal plate covering the maxillary and mandibular dentition. Voxel refers to the smallest unit that can be divided in three-dimensional space, and voxel density is the voxel content of the unit space. By adjusting the voxel density, the fineness of the 3D model can be adjusted. After the essential elements of these occlusal plates have been extracted, an algorithmic model of their automatic design can be constructed.

Figure 3:
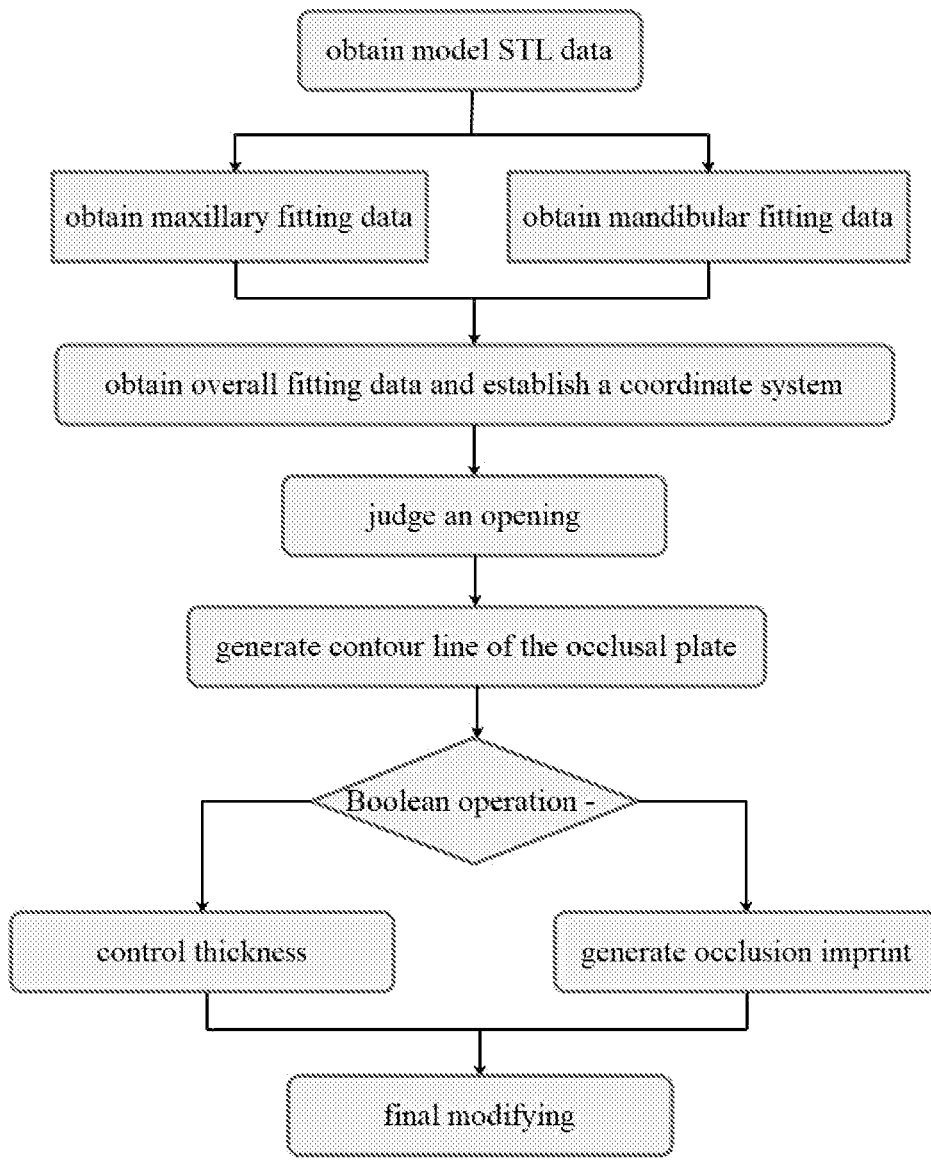
FIG. 3 is a schematic flowchart of an algorithm model according to an embodiment of the present invention.

Referring to FIG. 3, the algorithm flow is as follows.
Step 1: Scan the Model.
For a given maxillary and maxillary dentition model, it is scanned into STL (Standard File Type Applied by Rapid Prototyping Systems) data format.

Step 2: Obtain Separate Fitting Data Respectively for the Maxillary and Mandibular.

Obtain the planes fitted by the points of the maxillary and mandibular dentition models, i.e., the maxillary and mandibular fitting planes, and the center points of the maxillary and mandibular dentition models, that is, the maxillary and mandibular center points.

Step 3: Obtain Overall Fitting Data and Establish a Coordinate System.

Combine all the points in the maxillary and mandibular model into a point set, and obtain the overall center point and central plane, principal axis, lateral axis and normal vector through principal component analysis. The polar coordinate system is established by the plane where the main axis and the lateral axis are located to calculate the angle θ of all points of the maxillary and mandibular model.

Step 4: Simplify the Occlusal Plate and Judge an Opening.

Figure 4:
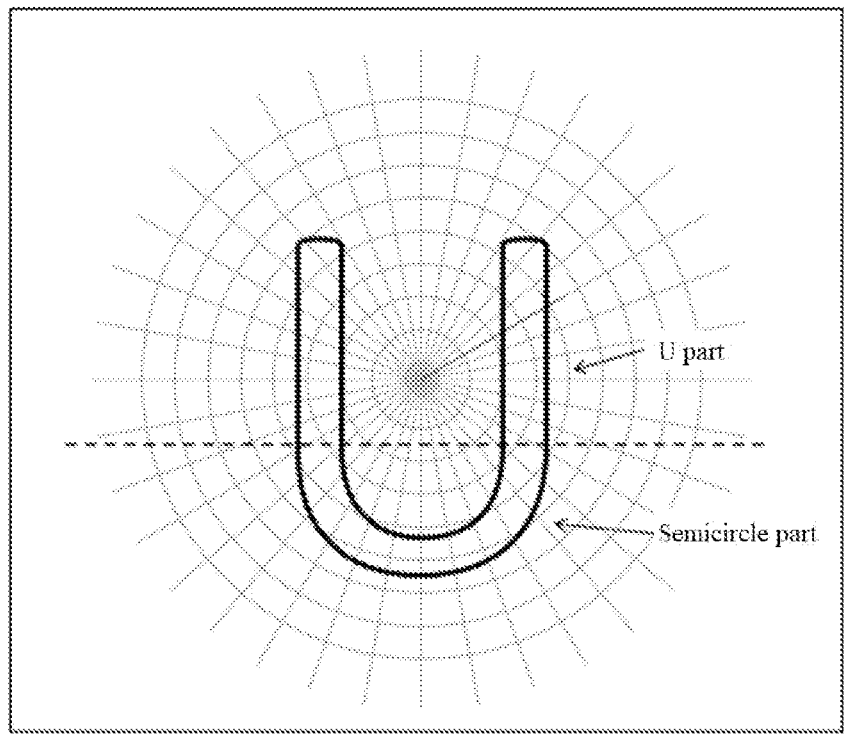
FIG. 4 is a U-shaped simplified structural schematic diagram of the artificial intelligence occlusal plate according to the embodiment of the present invention.

Referring to FIG. 4, simplify the plate into a U shape, divide it into 20 equal intervals in $[-\pi, \pi)$, calculate its distribution for the θ of all points, and judge an opening of the U shape by finding the angle interval without points, and correct the main axis direction towards where the central incisors are located.

Step 5: Generate Thickness Control Elements.

The maxillary fitting plane and the mandibular fitting plane are respectively stretched outward to obtain the maxillary assembly and the mandibular assembly.

Step 6: Generate a Two-Dimensional Contour Line.

The points concentrated in the range of $(-\pi/2, \pi/2)$, that is, the points in the U-shaped semicircle area, are fitted to inner and outer contour curves of the semicircular area of the U-shaped plate. For points beyond (−π/2, π/2) range of points, fit as a straight line segment, and connect with the foregoing curve to obtain a complete two-dimensional contour line of the U-shaped plate and smooth it.

Step 7: Boolean Operation 1—Thickness Control.

The two-dimensional contour line is linearly 3D stretched to obtain the initial three-dimensional U-shaped plate, and then the maxillary and mandibular assemblys are subtracted through Boolean operations to control the thickness.

Step 8: Boolean Operation 2—Occlusion Imprint Generation.

By moving the overall central plane according to the normal vector, the relationship between the plate and the maxillary dentition can be further coordinated. Subtract the maxillary dentition and the mandibular dentition with Boolean operation to get the occlusal imprint of the occlusal plate.

Step 9: Final Modifying.

Kalman filtering, smoothing and hole filling operations are performed to ensure water tightness, and the final 3D U-shaped plate, i.e., AI occlusal plate, is obtained.

Figure 5:
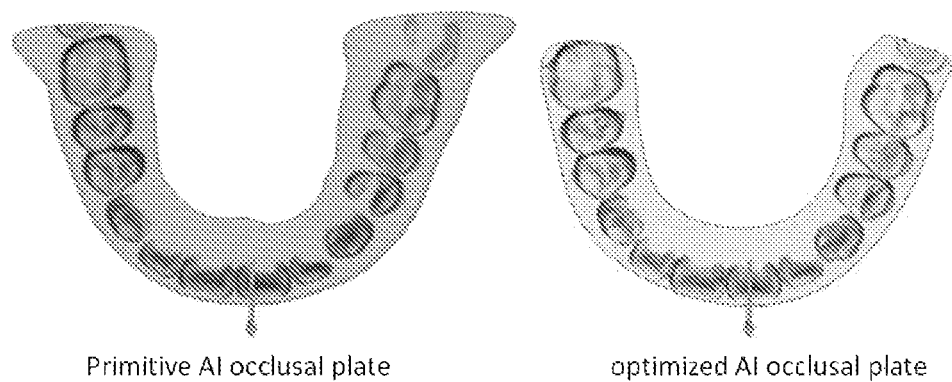
FIG. 5 is an optimized comparison diagram of the artificial intelligence occlusal plate according to the embodiment of the present invention.

During the research and development process, the STL dentition models of various malocclusion patients were used for research, the rationality of the contour line of the AI plate and the accuracy of the algorithm were manually verified, and then the contour line and algorithm model were continuously optimized to develop an artificial intelligence orthognathic surgical platea automatic design program, abbreviated as AIPlate. After optimization, the contour line has gradually become smoother from the initial steepness, and the occlusal imprint is more in line with clinical needs, such as FIG. 5 shown to meet clinical use standards.

The shape and cusp relationship of AI occlusal plate is not significantly different from that of manual occlusal plate, but it can greatly save the time required to design the occlusal plate.

Figure 6:
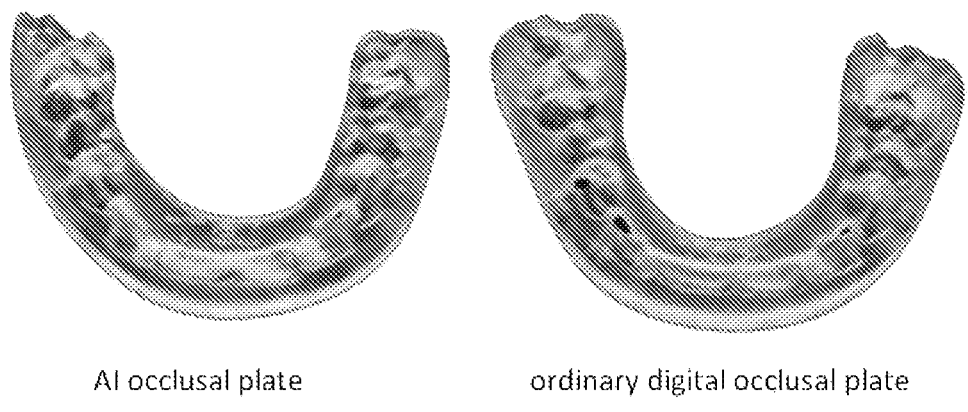
FIG. 6 is a schematic diagram of the comparison between the artificial intelligence occlusal plate (left) and the ordinary digital occlusal plate (right) according to the embodiment of the present invention.

Referring to FIG. 6, morphological analysis of thickness and width, there is no obvious difference between AI occlusal plate and ordinary occlusal plate. For shape, the similarity between AI occlusal plate and ordinary occlusal plate is very high. For depth of the maxillary and mandibular occlusal imprints, both the maxillary and mandibular occlusal imprints of AI occlusal plate and ordinary occlusal plate cover evenly, and there is no obvious difference between the maxillary and mandibulars. For fineness, they are basically the same. At the same time, compared with manual occlusal plate, the time required for AI occlusal plate design is greatly shortened, which can greatly improve efficiency, as shown in the following table.

|  | Manual occlusal plate | AI occlusal plate |
| --- | --- | --- |
| Monomaxillary (final plate) | 2-3 min | 10 s |
| Bimaxillary(middle stage plate + final plate) | 4-6 min | 20 s |

The accuracy of artificial intelligence orthognathic surgery occlusal plate is not significantly different from manual occlusal plate in orthognathic surgery application:

In monomaxillary or bimaxillary orthognathic surgery, two groups of patients were guided by the AI occlusal plate and the ordinary occlusal plate respectively, and satisfactory results were achieved postoperatively. The postoperative spiral CT reconstructed skulls of the two groups were aligned with the preoperative simulation files, and then exported to Mimics Medical 19.0 software, and deviation analysis was performed to generate color distance maps and triangular slice distribution histograms. In the monomaxillary, the overall deviation between the AI occlusal plate group and the ordinary occlusal plate group (about 80% of the triangular slice distribution) is within 0.5 mm, and there is no significant difference between the two. In the bimaxillary, the overall deviation of the AI occlusal plate group and the ordinary occlusal plate group (about 80% of the triangular piece distribution) is within 1.2 mm, and there was no significant difference between the two. From the above, we can verify that there is no significant difference between the AI occlusal plate and the manual occlusal plate in the comparison of postoperative results, which proves that there is no significant difference between the two in guiding the overall positioning of the bone block during the operation. At the same time, the comparison of preoperative and postoperative cephalometric related landmarks shows that the AI occlusal plate can achieve better positioning as well as the ordinary occlusal plate in the positioning of important landmarks.

Finally, it should be noted that the above embodiments are only used to illustrate the technical solutions of the present invention rather than to limit them. Although the present invention has been described in detail with reference to the above embodiments, those of ordinary skill in the art should understand that: the present invention can still be Modifications or equivalent replacements are made to the specific embodiments of the present invention, and any modifications or equivalent replacements that do not depart from the spirit and scope of the present invention shall be included within the protection scope of the claims of the present invention.

What is claimed is:

1. A design method of an orthognathic surgical occlusal plate based on artificial intelligence, comprising;
    scanning a gypsum model of a maxillary and mandibular dentition to obtain a corresponding three-dimensional model of the maxillary and mandibular dentition;
        obtaining a fitting data and establishing a coordinate system based on the three-dimensional model of the maxillary and mandibular dentition;
        generating thickness control elements and two-dimensional contour line based on the fitting data;
        controlling the thickness of the three-dimensional model of the maxillary and mandibular dentition and generating an occlusal imprint of the three-dimensional model of the maxillary and mandibular dentition based on the thickness control elements and the two-dimensional contour line;
    modifying the thickness and occlusal imprint of the three-dimensional model of the maxillary and mandibular dentition to obtain an artificial intelligence occlusal plate;
    wherein the obtaining the fitting data and establishing the coordinate system based on the three-dimensional model of the maxillary and mandibular dentition, comprises;
        obtaining the planes fitted by the points of the three-dimensional model of the maxillary and maxillary dentition, including the maxillary fitting plane and the mandibular fitting plane;
        establishing a polar coordinate system by a plane where a main axis and a lateral axis are located to calculate the angle θ of all the points of the maxillary and mandibular dentition model according to all the points in the maxillary and mandibular dentition model;
wherein the establishing the polar coordinate system by the plane where the main axis and the lateral axis are located to calculate the angle θ of all the points of the maxillary and mandibular dentition model according to all the points in the maxillary and mandibular dentition model, comprises:
combining all the points in the maxillary and mandibular dentition model into a point set, and obtain the overall center point, central plane, main axis, lateral axis and normal vector through principal component analysis; and establishing a polar coordinate system through the plane where the main axis and lateral axis are located to calculate the angle θ of all points of the maxillary and mandibular model;
wherein the generating thickness control elements and two-dimensional contour lines based on the fitting data, comprises:
simplifying the occlusal plate and judging the opening according to the fitting data,
generating thickness control elements;
generating two-dimensional contour lines;
wherein the simplifying the occlusal plate and judging the opening according to the fitting data, comprises;
simplifying both the maxillary fitting plane and the mandibular fitting plane into a U shape, and equally dividing both the maxillary fitting plane and the mandibular fitting plane into 20 intervals in the range of [−π,π), calculating a distribution of the angle θ of all points, and finding out angle interval without points, so as to judge the opening of the U-shaped, and correct the direction of the main axis towards a central incisor;
wherein the generating thickness control elements, comprises:
extruding the maxillary fitting plane and mandibular fitting plane outward respectively to obtain a maxillary assembly and a mandibular assembly;
wherein the generating two-dimensional contour lines, comprises:
fitting the points concentrated in the range of (−π/2, π/2), that is, fitting the points in the U-shaped semicircle area, to inner and outer contour curves of a semicircular area of the U-shaped plate, and fitting the points beyond the range of (−π/2, π/2) as a straight line segment, connecting the straight line segment with the inner and outer contour curves to obtain a complete two-dimensional contour line of the U-shaped plate, and then smoothing the two-dimensional contour line of the U-shaped plate.

2. The method according to claim 1, wherein the scanning of the gypsum models of the maxillary and mandibular dentition model to obtain the corresponding three-dimensional models of the maxillary and mandibular dentition model, comprises:

scanning a given gypsum model of the maxillary and mandibular dentition into a standard file type data format applied by the rapid prototyping system, to obtain the corresponding three-dimensional model of the maxillary and mandibular dentition.

3. The method of claim 1, wherein the controlling of the thickness of the three-dimensional model of the maxillary and mandibular dentition and the generating of the occlusal imprint of the three-dimensional model of the maxillary and mandibular dentition according to the thickness control elements and the two-dimensional contour line, comprises:

stretching the two-dimensional contour line linearly in three-dimension to obtain the initial three-dimensional U-shaped plate, and then subtracting the maxillary assembly and the mandibular assembly to control the thickness according to the thickness control elements and the two-dimensional contour line;

coordinating the relationship between the occlusal plate and the maxillary and mandibular dentition by moving the overall central plane according to the normal vector, and subtracting the maxillary dentition and the mandibular dentition from the overall dentition model by Boolean operation to obtain the occlusal imprint of the occlusal plate.

4. The method of claim 1, wherein the modifying of the thickness and occlusal imprint of the maxillary and mandibular dentition three-dimensional model to obtain an artificial intelligence occlusal plate, comprises:

Kalman filtering, smoothing and hole filling operations to ensure water tightness, to obtain the final three-dimensional U-shaped plate, thereby the artificial intelligence occlusal plate is obtained.

* * * * *